United States Patent [19]

Liu

[11] 4,181,899
[45] Jan. 1, 1980

[54] HIGH POWER OPTICAL SECOND HARMONIC GENERATION IN NON-LINEAR CRYSTALS

[75] Inventor: Yung S. Liu, Scotia, N.Y.

[73] Assignee: General Electric Company, Schenectady, N.Y.

[21] Appl. No.: 857,419

[22] Filed: Dec. 5, 1977

[51] Int. Cl.² .............................................. H01S 3/13
[52] U.S. Cl. ......................... 331/94.5 C; 331/94.5 N; 331/94.5 S
[58] Field of Search .................... 331/94.5 C, 94.5 N, 331/94.5 M, 94.5 S; 307/88.3; 332/7, 51

[56] References Cited

U.S. PATENT DOCUMENTS

| | | | |
|---|---|---|---|
| 3,679,999 | 7/1972 | Chernoch | 331/94.5 P |
| 4,019,159 | 4/1977 | Hon et al. | 331/94.5 M |
| 4,025,875 | 5/1977 | Fletcher | 331/94.5 S |

OTHER PUBLICATIONS

Hon, Electrooptical Compensation for Self-Heating in CD*A During Second-Harmonic Generation, IEEE J. Quant. Elect. QE12, No. 2, (Feb. 1976), pp. 148-151.

*Primary Examiner*—William L. Sikes
*Attorney, Agent, or Firm*—Nathan D. Herkamp; Joseph T. Cohen; Paul R. Webb, II

[57] ABSTRACT

Harmonic generation in a nonlinear crystal, arising out of high power optical energy produced by a neodymium-doped glass laser operating at 1.06 micrometers wavelength, is normally limited by crystal self-heating due to thermal-optical effects that cause phase-mismatch and reduce conversion efficiency. This limitation is overcome by tuning the laser wavelength to compensate for the phase-mismatch and thereby permit improved conversion efficiency for harmonic generation. The tuning is varied in accordance with sensed crystal temperature.

20 Claims, 4 Drawing Figures

HIGH POWER OPTICAL SECOND HARMONIC GENERATION IN NON-LINEAR CRYSTALS

INTRODUCTION

This invention relates to generation of harmonic optical energy in a non-linear crystal, and more particularly to a method and apparatus for compensating such crystal for deleterious thermal-optical effects due to crystal self-heating when coherent optical energy is frequency-multiplied therein.

Nonlinear crystals, such as cesium dideuterium arsenate (hereinafter CD*A), have been employed in generating second harmonic frequencies from neodymium-doped glass lasers. As is well known in the art, use of CD*A is advantageous for doubling frequency at wavelengths of 1.06 micrometers since it provides a 90° phase-match, high damage resistance, and high conversion efficiency. Nevertheless, I have found that power handling capability of the crystal is severely limited by the thermal-optical induced phase-mismatch of the crystal at an incident power level exceeding several watts. That is, impingement of high power coherent optical energy on the crystal causes a rise in temperature of the crystal, resulting in a phase-mismatch between the fundamental and second harmonic wave vectors which thereby reduces conversion efficiency. (For purposes of understanding the invention described herein, the term "high power" indicates a power level sufficiently high to bring about the aforementioned temperature rise of the crystal.) The dispersion properties of the nonlinear crystal restrict its spectral bandwidth for phase-matching, so that relatively small temperature changes can result in a severe reduction in conversion efficiency. It would be desirable to overcome these limitations in use of nonlinear crystals for generating harmonic frequencies, so as to compensate for the temperature rise in the crystal that produces the phase-mismatch and consequential reduction in conversion efficiency. The present invention is directed to accomplishing this result.

Accordingly, one object of the invention is to provide a method and apparatus for generating harmonic frequencies of a high power beam of coherent optical energy in a nonlinear crystal with high conversion efficiency.

Another object of the invention is to provide a method and apparatus for compensating a high power coherent optical system for a shift in phase-matching center wavelength of a nonlinear crystal performing a harmonic frequency generating function.

Another object is to provide a method and apparatus for altering output frequency of a neodymium-doped glass laser in response to temperature rise of a nonlinear crystal producing harmonics of the laser output frequency.

Briefly, in accordance with a preferred embodiment of the invention, a high power, Q-switched, tunable laser providing optical energy at both fundamental and harmonic frequencies comprises an optically-resonant cavity having reflective means at either end thereof, one of the reflective means being partially transmissive, and an active laser medium such as neodymium-doped glass disposed within the cavity so as to emit optical energy along an optic axis in a direction normal to the reflecting surface of each of the reflective means. Tuning means, such as electro-optical tuning means, situated within the cavity in the path of optical energy emitted from the active medium serve to alter frequency at which optical energy may pass therethrough in accordance with an electrical voltage supplied thereto. A nonlinear crystal situated astride the optic axis is oriented such that its phase-matching direction coincides with the path of optical energy at the fundamental frequency emerging from the cavity through the partially-transmissive reflective means. Transducer means responsive to temperature of the nonlinear crystal produce an electronic indication of any change in temperature of the nonlinear crystal. Means responsive to the transducer means supply an electrical voltage to the tuning means so as to adjust frequency of the optical energy emerging from the cavity in order to maintain substantially perfect phase-matching in the nonlinear crystal irrespective of temperature of the crystal.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
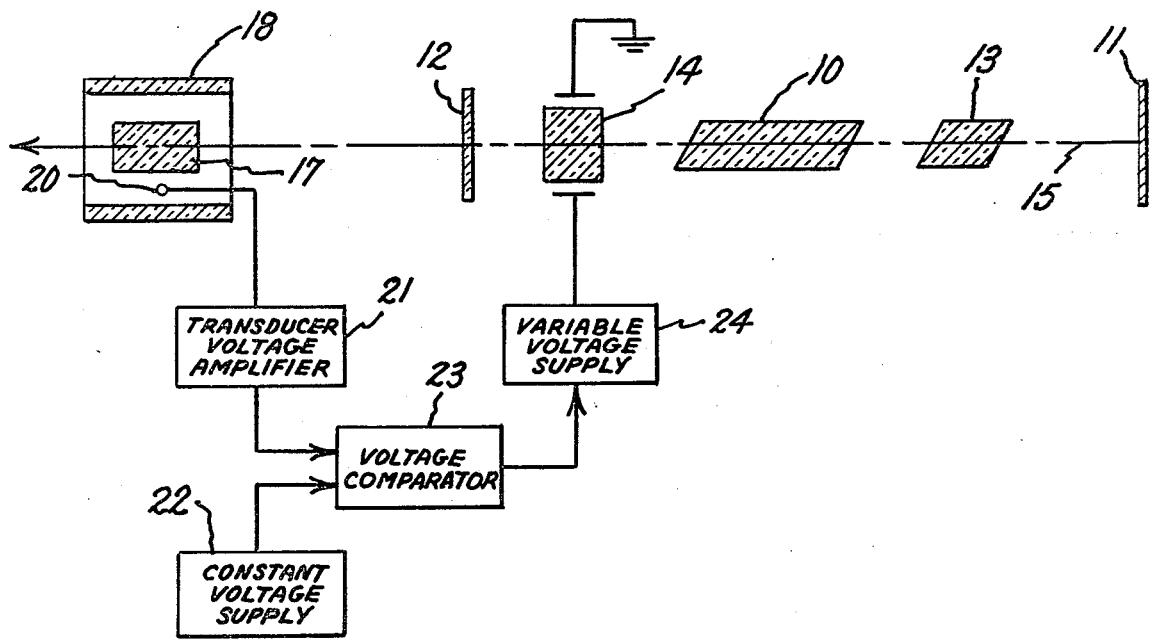
FIG. 1 is a schematic diagram illustrating a first embodiment of the invention.

In the embodiment illustrated in FIG. 1, a high power laser is defined within a pair of reflecting means such as mirrors 11 and 12 forming opposite ends of a Fabry-Perot type optically-resonant cavity. Output mirror 12, as known in the art, constitutes a partial reflector. An emitting structure 10 comprising an active laser medium in which an inversion of energy population states may be established by pumping, or irradiation of the medium with high intensity electromagnetic radiation of appropriate energy, is situated within the cavity. When such population inversion, which is prerequisite to emission of coherent radiation, exists within the active laser medium of structure 10, a large number of electrons in the active medium are elevated to an excited energy state. Incident photons of the laser emission wavelength may then stimulate transitions from the excited state to a lower energy state. These transitions are cumulative, resulting in emission of coherent radiation.

Emitting structure 10 may conveniently comprise the "zig zag" configuration described in J. P. Chernoch U.S. Pat. No. 3,679,999, issued July 25, 1972 and assigned to the instant assignee, in which the optical path inside structure 10 follows a zig zag path and which, viewed from the side, assumes the configuration of a parallelogram. The longitudinal axis of emitting structure 10 coincides with optical axis 15 of the resonant cavity. The active medium of emitting structure 10 may comprise, for example, 2%–3% neodymium-doped glass, available from Owens-Illinois, Inc., Toledo, Ohio, under the nomenclature ED-2. The pumping wavelength is preferably in the range of 500 to 900 nanometers, and structure 10 emits coherent radiation at approximately 1.06 micrometers.

A Q-switching cell 13, of parallelepiped configuration, is situated between emitting structure 10 and reflector 11. This cell exhibits the Pockels effect in a manner well known in the art; that is, when no electric field is applied across the cell, optical energy passes through the cell without any modification in direction of polarization. However, when an appropriate electric field is impressed across the cell, the polarization plane of a polarized light beam impinging upon the cell is rotated about the direction of the beam. Hence if the voltage is applied across cell 13 so as to rotate the polarization plane of optical energy impinging thereon from structure 10, light reflected from mirror 11 and impinging upon cell 13 is polarized in still another plane after passing through the cell on its return from reflector 11. Thus if the voltage across cell 13 is such as to rotate the polarization plane of light passing therethrough by 90°, the beam reflected from mirror 11 suffers increased loss, causing hand, if no voltage is applied across cell 13, the optical energy undergoes essentially no modification when passing therethrough in either direction. Laser oscillation therefore can take place because sufficient power can be stored inside the cavity to allow laser emission to occur. This type of action is known as Q-switching. Cell 13 may typically be comprised of a potassium dideuterium phosphate (also known as KD*P) crystal.

The laser output beam is line-narrowed by employing a tuning element 14 in the resonant cavity between active element 10 and output reflector 12. Tuning element 14 may, for example, comprise a piezoelectrically-driven Fabry-Perot etalon, such as a Burleigh model TL-15, with 100 micrometer spacing and 50% reflectivity at 1.06 micrometers. Other types of electro-optical crystals, or electronic tuning, may alternatively be employed to achieve line-narrowing. The function of line-narrowing and tuning within the laser cavity by use of a birefringent filter situated therein is described and claimed in Y. S. Liu application Ser. No. 668,605, filed Mar. 19, 1976 and assigned to the instant assignee.

Frequency-doubling is achieved by employing a nonlinear crystal 17 in the near field of the laser, oriented in a direction such that its phase-matching direction coincides with the path of optical energy emerging from the resonant cavity through partially-transmissive reflector 12 and such that maximum second harmonic frequency is generated at the center wavelength of the 1.06 micrometer band. As illustrated, crystal 17 may conveniently be situated in the near field of the laser although, if preferred, it may be situated inside the resonant cavity. It is well known that efficient second harmonic generation in a nonlinear crystal requires phase-matching of the fundamental and second harmonic wave vectors; however, the dispersion properties of the crystal restrict the spectral bandwidth for phase matching.

CD*A crystals are presently the most efficient nonlinear crystals for producing second harmonic generation from neodymium-doped glass lasers. This is because such crystals exhibit a 90° phase-match at 1.06 micrometers, high damage resistance, and high conversion efficiency. However, I have found that the power handling capability of CD*A crystals is severely limited by the thermal-optical induced phase-mismatch of the crystal which occurs at incident power levels exceeding several watts. Crystal self-heating due to these thermal-optical effects reduces conversion efficiency of the crystals. Although crystal 17 in the apparatus of FIG. 1 is maintained in a constant-temperature oven 18 wherein the temperature is selected in order to achieve maximum conversion efficiency at the laser output wavelength of 1.06 micrometers, the crystal undergoes a temperature rise above that maintained by the oven due to thermal absorption of the laser radiation within the crystal. One way of overcoming such thermal-optical effects on crystal 17 is described by D. T. Hon, "Electro-optical Compensation for Self-Heating in CD*A During Second-Harmonic Generation", *IEEE Journal of Quantum* Electronics, Volume QE-12, Number 2, February, 1976, pages 148–151, wherein a pulsed electric field applied to a CD*A crystal is stated to produce an electro-optic correction for phase-mismatch at the second harmonic frequency. However, by adjusting tuning element 14 in the apparatus of FIG. 1, I have found that a simpler system for self-maintained phase-matching can be achieved.

As shown in FIG. 1, the temperature of CD*A crystal 17 is sensed by a thermocouple 20 inside oven 18. The thermocouple voltage is applied to a transducer voltage amplifier 21 which may, as a secondary function, produce a visual indication of the CD*A crystal temperature. A D.C. output voltage from amplifier 21, of amplitude depending upon CD*A crystal temperature, is compared against a constant amplitude D.C. voltage from constant voltage supply 22 in a voltage comparator 23. The difference voltage produced by the voltage comparator is supplied to a variable voltage supply 24 having a D.C. output voltage amplitude which increases or decreases in accordance with the amplitude of voltage applied thereto from comparator 23. The output voltage of variable voltage supply 24 is applied across tuning element 14, so as to control the laser output frequency. In this fashion, any change in output voltage from variable voltage supply 24 fine-tunes the laser output frequency so that the optical energy impinging on crystal 17 is of a frequency to maintain substantially perfect phase-matching within CD*A crystal 17 during the course of temperature change.

Figure 2:
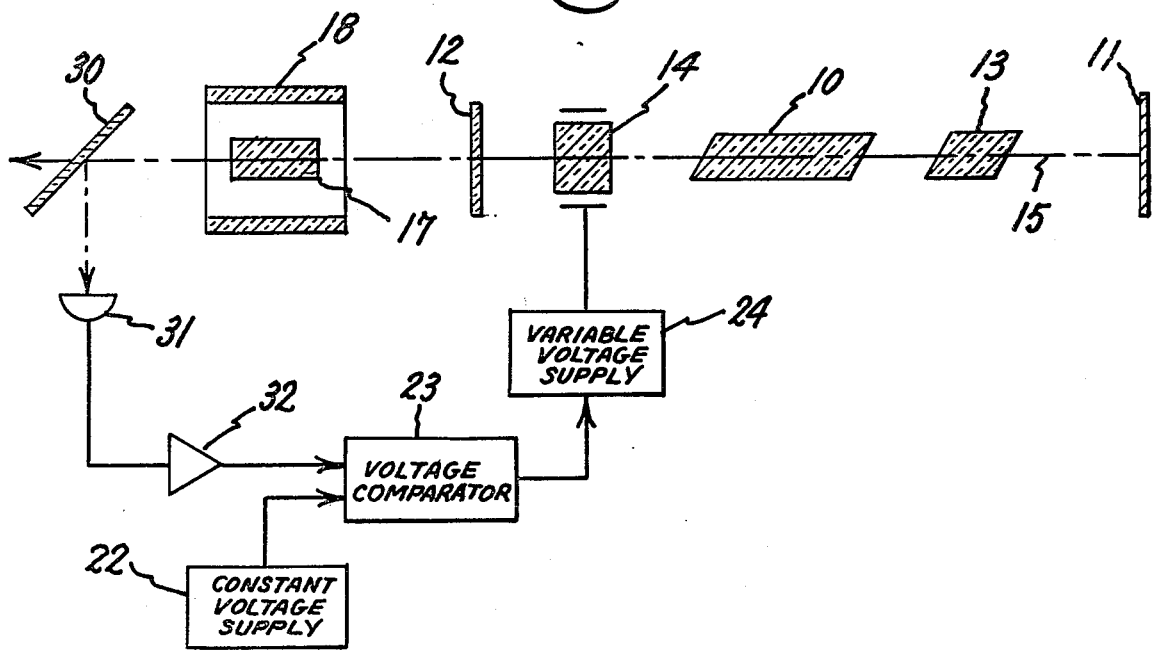
FIG. 2 is a schematic diagram illustrating a second embodiment of the invention.

In FIG. 2, a second embodiment of the invention is schematically illustrated, wherein like numerals signify like components. Thus the output of the laser from partial reflector 12 impinges on CD*A crystal 17, producing the aforementioned thermal-optical phase-mismatch at incident power levels exceeding several watts. As in the apparatus shown in FIG. 1, crystal 17 may, if preferred, be situated within the resonant cavity defined by reflectors 11 and 12. Instead of employing a thermocouple inside oven 18 to sense severity of the phase-mismatch, however, a dielectric polarizer or Glan prism 30 is situated at the output of CD*A crystal 17 to deflect a portion of the coherent light of 0.53 micrometers wavelength onto an optical detector 31 which produces an electronic output signal of amplitude varying in accordance with intensity of light impinging thereon. Optical means 30 blocks substantially all of any light at 1.06 micrometers wavelength, and passes the light at 0.53 micrometers wavelength, outward along optic axis 15 without any substantial attenuation. Thus, when coherent light of 0.53 micrometers wavelength strikes dielectric polarizer 30, the dielectric polarizer, being highly transparent to light of that wavelength, passes most of this light of that wavelength outward; however, a small portion of this light is instead reflected by dielectric polarizer 30 onto optical detector 31. Those skilled in the art will appreciate that the amplitude of light of 0.53 micrometers wavelength reflected by dielectric polarizer 30 is advantageously weak, so as to minimize the portion of second harmonic radiation employed solely in a sensing function for determining the degree of phase-mismatch in crystal 17. Since dielectric polarizer 30 exhibits a constant, albeit small, reflectivity to radiation pf 0.53 micrometers wavelength, optical detector 31 furnishes an accurate output indication of the intensity of 0.53 micrometers wavelength radiation emerging from CD*A crystal 17. The D.C. output signal from optical detector 31 is furnished through an amplifier 32 to one input of voltage comparator 23. A constant D.C. voltage is supplied from constant voltage supply 22 to the second input of voltage comparator 23. Correction of the phase-mismatch within CD*A crystal 18 is then accomplished through variable voltage supply 24 and tuning element 14 in the manner described in conjunction with the apparatus of FIG. 1, maintaining the second harmonic radiation at maximum power.

Figure 3:
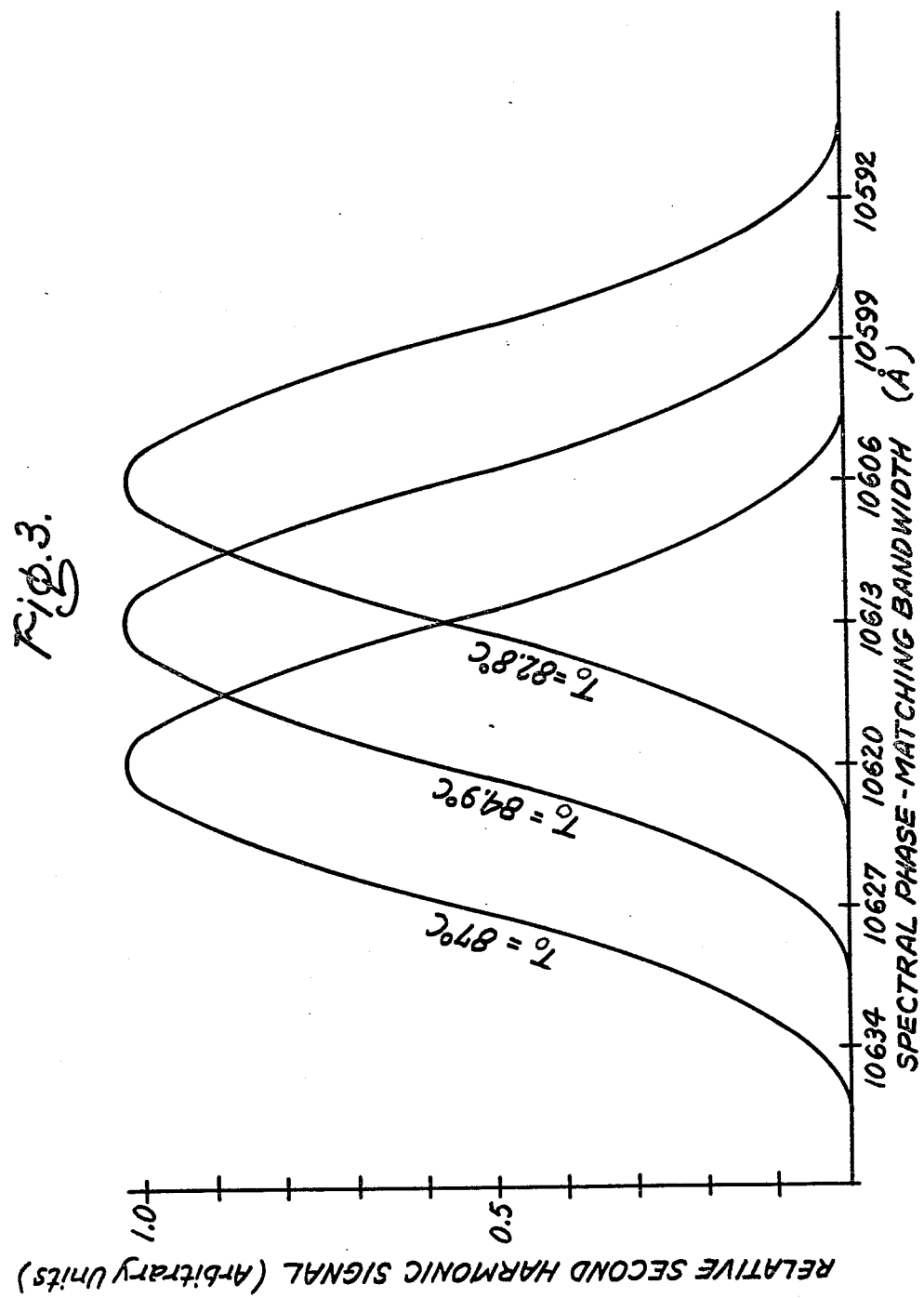
FIG. 3 is a graphical illustration of the shift in spectral phase-matching bandwidth at different frequency-doubling crystal temperatures.

FIG. 3 illustrates the spectral phase-matching property of a 90° phase-matched CD*A crystal at three different crystal temperatures, designated $T_o$. The crystal was 45° Z-cut and housed inside an oven. Crystal dimensions were 15×10×10 mm. A tunable neodymium-doped glass laser was used to generate the fundamental beam which was scanned over a spectral range of 10,634 angstroms to 10,592 angstroms.

That the apparatus of FIGS. 1 and 2 can maintain phase-matching to obtain a high conversion efficiency at a high average power level by tuning the laser output to overcome thermal optical effects due to self-heating in CD*A crystal 17 may be shown as follows:

In generating second harmonic power, the amount of phase-mismatch may be expressed as $$\xi = \frac{\Delta k}{2} = \frac{2\pi}{\lambda_F}[n_1 - n_2]$$

where $\lambda_F$ is the fundamental wavelength, $n_1$ and $n_2$ are the refractive indices of the frequency-doubling crystal at the fundamental and the second harmonic wavelengths respectively, and $\xi$ is a function of wavelength, beam divergence, temperature, and strength of electric and stress fields.

The deviation from the perfect phase-matching condition, $\xi=0$, is given by:

$$\delta\xi = \frac{\delta\xi}{\delta\lambda}\delta\lambda + \frac{\delta\xi}{\delta T}\delta T + \frac{\delta\xi}{\delta E}\delta E + \frac{\delta\xi}{\delta\theta}\delta\theta$$

where $\lambda$, $T$, $E$ and $\theta$ denote wavelength, temperature, external field and angular divergence of the beam, respectively, and $\delta\lambda$, $\delta T$, $\delta E$, $\delta\theta$ represent their increments from the phase-matching condition, respectively. Considering only the effects due to wavelength, temperature and electric field, then $$\frac{\partial\xi}{\partial\lambda} = \frac{2\pi}{\lambda_F}\frac{\partial}{\partial\lambda}[n_2 - n_1] = \frac{2\pi}{\lambda_F}\left[\frac{1}{2}\frac{\partial n_2}{\partial\lambda} - \frac{\partial n_1}{\partial\lambda}\right],$$

$$\frac{\partial\xi}{\partial T} = \frac{2\pi}{\lambda_F}\frac{\partial}{\partial T}[n_2 - n_1] = \frac{2\pi}{\lambda_F}\left[\frac{\partial n_2}{\partial T} - \frac{\partial n_1}{\partial T}\right], \text{ and}$$

and $$\frac{\delta\xi}{\delta E} = \frac{2\pi}{\lambda_F}\frac{\delta}{\delta E}[n_2 - n_1] = \frac{\pi}{\lambda_F}n_o^3\gamma_{63}$$

where $n_o$ is the refractive index of the crystal and $\lambda_{63}$ is the nonlinear coefficient of CD*A. Using measured values, $$\delta\xi = [0.013\delta\lambda(\text{Å}) + 0.046\delta T(°C.) + 0.015\delta E(KV)](\text{mm})^{-1}.$$

Therefore, we obtain the derivative term $$\delta T/\delta\lambda = 0.30(°C./\text{Å}),$$

showing that the increase in temperature $\delta T$ due to self-heating or external temperature fluctuation can be compensated by tuning the wavelength.

Figure 4:
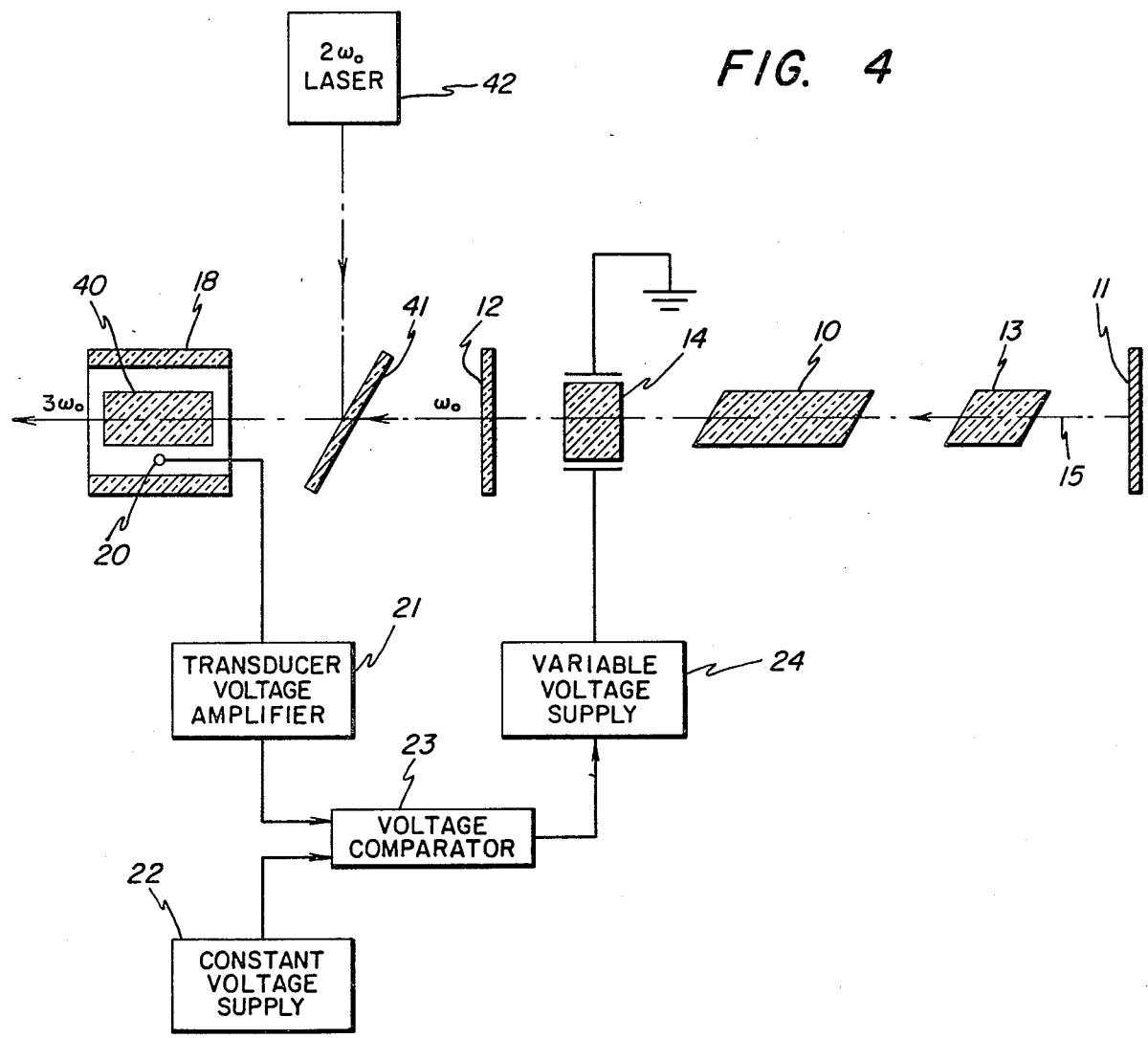
FIG. 4 is a schematic diagram illustrating a third embodiment of the invention.

In FIG. 4, a third embodiment of the invention is schematically illustrated, wherein like numerals signify like components. In this embodiment, a nonlinear crystal 40 such as deuterated potassium dihydrogen phosphate (KD*P), may be employed in oven 18 as a mixer to produce frequency tripling. Thus the output of the laser from partial reflector 12, at a specific polarization, passes through a beam combiner 41 and impinges on KD*P crystal 40, producing the previously-mentioned thermal-optical phase-mismatch at incident power levels exceeding several watts. The temperature of crystal 40 is sensed by thermocouple 20 inside oven 18, as in the apparatus illustrated in FIG. 1, and the thermocouple voltage is employed to adjust tuning element 14 to control the laser output frequency in the manner described in conjunction with the apparatus shown in FIG. 1. To achieve frequency tripling, however, a second laser 42 is employed to supply optical energy at twice the fundamental frequency $\omega_o$ emitted from the resonant cavity defined by reflectors 11 and 12, at a specific polarization and at a constant power level. The output energy of laser 42 is directed at beam combiner 41, so that coherent beams at frequencies $\omega_o$ and $2\omega_o$ are directed onto mixing crystal 40. The transducer voltage assures that the $\omega_o$ beam remains constantly at substantially the peak of the spectral phase-matching bandwidth for crystal 40, while the $2\omega_o$ beam frequency is maintained at an optimum value with respect to the spectral phase-matching bandwidth for crystal 40 at an expected average operating temperature for the crystal. Frequency multiplication in crystal 40 results in an output frequency of $3\omega_o$.

The foregoing describes a method and apparatus for generating harmonic frequencies of a high power beam of coherent optical energy in a nonlinear crystal with high conversion efficiency. Compensation is provided for a shift in phase-matching bandwidth of the nonlinear crystal performing the harmonic frequency generating function. Two alternatives for adjusting output frequency of a neodymium-doped glass laser in response to temperature rise of the nonlinear crystal are set forth.

While only certain preferred features of the invention have been shown by way of illustration, many modifications and changes will occur to those skilled in the art, including combinations of the methods and apparatus described herein to generate higher order harmonics. It is, therefore, to be understood that the appended claims are intended to cover all such modifications and changes as fall within the true spirit of the invention.

I claim

1. A high power, Q-switched, tunable laser providing optical energy at both a fundamental frequency and harmonic frequency thereof, comprising:
   an optically-resonant cavity having reflective means at either end thereof, one of said reflective means being partially transmissive;
   an active laser medium disposed within said cavity so as to emit optical energy along an optic axis in a direction normal to the reflecting surface of each of said reflective means;
   tuning means situated within said cavity in the path of optical energy emitted from said active medium, said tuning means being adapted to alter frequency at which optical energy may pass therethrough in accordance with an electrical voltage supplied thereto;
   a nonlinear crystal situated astride said optic axis and oriented such that its phase-matching direction coincides with the path of optical energy emerging from said cavity through said partially-transmissive reflective means;
   transducer means responsive to temperature of said nonlinear crystal for producing an electronic indication of any change in temperature of said nonlinear crystal; and
   means responsive to said transducer means for supplying an electrical voltage to said tuning means so as to adjust frequency of said optical energy emerging from said cavity in order to maintain substantially perfect phase-matching in said nonlinear crystal irrespective of temperature of said nonlinear crystal.

2. The apparatus of claim 1 wherein said transducer means comprises a thermocouple.

3. The apparatus of claim 1 wherein said nonlinear crystal is situated within a constant temperature oven.

4. The apparatus of claim 2 wherein said nonlinear crystal is situated within a constant temperature oven.

5. The apparatus of claim 1 wherein said active laser medium comprises neodymium-doped glass and said tuning means comprises electro-optical tuning means.

6. The apparatus of claim 1 wherein said nonlinear crystal comprises cesium dideuterium arsenate.

7. The apparatus of claim 3 wherein said nonlinear crystal comprises cesium dideuterium arsenate.

8. The apparatus of claim 1 wherein said nonlinear crystal is situated outside said cavity.

9. The apparatus of claim 8 including a constant frequency laser producing optical energy at twice said fundamental frequency, and means directing said optical energy produced by said tunable laser and by said constant frequency laser onto said nonlinear crystal to provide third harmonic optical energy from said crystal.

10. The apparatus of claim 9 wherein said nonlinear crystal comprises potassium dideuterium phosphate.

11. A high power, Q-switched, tunable laser producing optical energy at both a fundamental frequency and harmonic frequency thereof, comprising:
    an optically-resonant cavity having reflective means at either end thereof, one of said reflective means being partially transmissive;
    an active laser medium disposed within said cavity so as to emit optical energy along an optic axis in a direction normal to the reflecting surface of each of said reflective means;
    tuning means situated within said cavity in the path of optical energy emitted from said active medium, said tuning means being adapted to alter frequency at which optical energy may pass therethrough in accordance with an electrical voltage supplied thereto;
    a nonlinear crystal situated astride said optic axis and oriented such that its phase-matching direction coincides with the path of optical energy emerging from said cavity through said partially-transmissive reflective means;
    optical detecting means producing an output voltage of amplitude varying in accordance with intensity of optical radiation impinging thereon;
    substantially transparent optical means partially reflective to radiation at said harmonic frequency of optical energy emerging from said optically-resonant cavity, said substantially transparent optical means being situated in the path of optical energy emerging from said nonlinear crystal and oriented such that radiation reflected therefrom impinges on said optical detecting means; and
    means responsive to said substantially transparent optical means for supplying an electrical voltage to said tuning means so as to adjust frequency of said optical energy emerging from said cavity in order to maintain substantially perfect phase-matching in said nonlinear crystal irrespective of temperature of said nonlinear crystal.

12. The apparatus of claim 11 wherein said nonlinear crystal is situated within a constant temperature oven.

13. The apparatus of claim 11 wherein said nonlinear crystal comprises cesium dideuterium arsenate.

14. The apparatus of claim 12 wherein said nonlinear crystal comprises cesium dideuterium arsenate.

15. The apparatus of claim 8 wherein said active laser medium comprises neodymium-doped glass and said tuning means comprises electro-optical tuning means.

16. The apparatus of claim 11 wherein said nonlinear crystal is situated outside said cavity and said substantially transparent optical means is situated outside said cavity.

17. A method of maintaining efficient generation of harmonic frequencies from a tunable laser comprising the steps of:
    irradiating a nonlinear crystal with coherent light from said laser;
    monitoring temperature of said nonlinear crystal; the step of monitoring temperature of said nonlinear crystal including the step of providing an electrical signal of intensity depending upon sensed temperature of said nonlinear crystal; and
    fine-tuning the output frequency of said tunable laser responsive to said electrical signal so as to maintain phase-matching within said nonlinear crystal irrespective of said nonlinear crystal temperature.

18. The method of claim 17 wherein said step of fine-tuning the output frequency of said tunable laser comprises applying a voltage to an electro-optical tuning element within said laser of amplitude varying in accordance with sensed temperature of said nonlinear crystal.

19. A method of maintaining efficient generation of harmonic frequencies from a tunable laser comprising the steps of:
    irradiating a nonlinear crystal with coherent light from said laser;
    monitoring intensity of harmonic radiation emerging from said nonlinear crystal; said step of monitoring intensity of harmonic radiation emerging from said nonlinear crystal including the step of providing an electrical signal of intensity depending upon sensed intensity of harmonic radiation emerging from said nonlinear crystal; and fine-tuning the output frequency of said tunable laser including the step of applying a voltage to an electrooptical tuning element within said laser of amplitude varying in accordance with magnitude of said electrical signal so as to maintain phase-matching within said nonlinear crystal irrespective of said nonlinear crystal temperature.

20. The method of claim 19 including the step of separating harmonic radiation energy from fundamental radiation energy emerging from said nonlinear crystal.

* * * * *